United States Patent [19]

Jones et al.

[11] Patent Number: 4,496,002

[45] Date of Patent: Jan. 29, 1985

[54] HORSESHOE

[76] Inventors: Joseph W. Jones, 6119 Bermuda Dunes Dr., Houston, Tex. 77069; Edward W. Bishop, Box 47H, Brookshire, Tex. 77423

[21] Appl. No.: 515,830

[22] Filed: Jul. 21, 1983

[51] Int. Cl.³ ............................................... A01L 5/00
[52] U.S. Cl. ......................................... 168/4; 168/12; 168/26; 168/DIG. 1
[58] Field of Search .................. 168/4, 11, 14, 13, 26, 168/DIG. 1, 12, 28; 59/36, 61

[56] References Cited

U.S. PATENT DOCUMENTS

| 740,665 | 10/1903 | Larsen. | |
|---|---|---|---|
| 2,705,536 | 4/1955 | Phreaner | 168/14 |
| 3,469,631 | 9/1969 | Becker | 168/DIG. 1 |
| 3,513,915 | 5/1970 | Sherman | 168/DIG. 1 |
| 3,519,079 | 7/1970 | Bieber | 168/DIG. 1 |
| 4,246,390 | 1/1981 | Seaver | 526/352 |

FOREIGN PATENT DOCUMENTS 1566561  5/1980  United Kingdom .................... 168/4

Primary Examiner—Robert P. Swiatek
Attorney, Agent, or Firm—Biebel, French & Nauman

[57] ABSTRACT

Shoes for horses are fabricated from ultra-high molecular weight ethylene polymers having a molecular weight of at least 1 million. Such shoes are light weight, have good wear properties, and are much easier on the horse's feet than metal shoes.

9 Claims, No Drawings

HORSESHOE

BACKGROUND OF THE INVENTION

The present invention relates to shoes suitable for horses, or any animal requiring hoof protection, prepared from ultra-high molecular weight polyethylene.

One of the major causes of lameness in horses is the direct result of horseshoes that restrict the natural flexing (i.e. expansion and contraction) of the horse's foot, maximize concussion, cause corns, enhance fatigue from their heavy weight, inflict severe cuts and bruises, and provide inadequate protection. Whether used for pleasure, work, or competition, horses are used on a wide variety of surfaces, natural and artificial, which can cause overstressing and damage tendons, cartilage, and bone. It has been suggested that fatigue failure is a major cause of lameness, and lameness is directly related to the hardness of the surface on which horses are used[1]. Data show a linear, direct relationship between lameness on California racetracks and the hardness of the tracks. The peak shock level on a horse's hoof is about 2000 pounds of force when galloping across pavement or hard dirt, and 800–1000 pounds on grass. This shock can be greatly reduced by using a shoe that has good shock resistant and impact resistant properties. When shock and concussion are reduced on the horse's feet and legs, lameness is reduced.

[1]"Foreleg Fatigue Fracture," Cheney, J. A.; Lion, S. Y.; Shen, C. K.; Wheat, J. D., *Thoroughbred of California*, November 1971.

With the increasing number of pleasure horses, work horses (metropolitan mounted police), and draft horses being used on paved surfaces, there is concern being given to the damage hard metal shoes cause to the surfaces. Indeed, several articles have been written expressing this concern and the subsequent increased costs of street and road maintenance and repair. Horse owners, including trail riders, Amish draft horse owners, and municipalities, are encouraged to replace hard metal shoes with more resilient, less damaging shoes. Similarly, the destruction and enhanced wear on private barn floors, walkways, and surfaced paths resulting from hard metal horseshoes is significant.

Another concern to the horse owner that results from the use of hard metal shoes is the restricted "natural" action of the hoof. When a horse is in motion, the natural movement of the hoof is to expand slightly under weight and to contract when the animal's weight is shifted. Rigid metal shoes restrict this natural hoof action, which further contributes to fatigue and lameness.[2] A further disadvantage to the use of hard, rigid shoes can be found in that, when this natural hoof flexing is restricted by the shoe, there is a tendency to place considerable stress on the nails holding the rigid shoe to the hoof that normally expands and contracts, resulting in the loosening of the nails or pulling the nails through the hoof and eventually throwing the shoe. A heavy, hard metal shoe that comes loose or is thrown can inflict severe cuts or bruises to the animal.

[2]The complex action of the parts of the hoof has been described in several articles in the literature. A comprehensive study of the structure and behavior of horses' feet in action may be found in the August 1977 issue of *Saddle Action*, published by Saddle Action, Inc., Paso Robles, Calif., pages 18–21, 50, written by K. D. Butler, Jr.

Accordingly, there exists a need for a light weight, shock absorbant, abrasion resistant, flexible horseshoe that will provide therapeutic advantages to the animal and minimize damage to the surfaces on which the animal is used.

Many attempts have been made in prior art to provide a protective device for the horse's foot incorporating the objectives mentioned above. For example, the hoof coverings described in U.S. Pat. Nos. 4,235,292 and 4,206,811 consist of an integrally designed steel yoke in a plastic body attached with screws. U.S. Pat. Nos. 4,189,004; 3,703,209; and 3,732,929 teach that polyurethane rubber boot-type horseshoes have desirable characteristics. A hard rubber sheet containing small metal fragments is described in U.S. Pat. No. 3,513,915. Indeed, cast polyurethane horseshoes appear to be the preferred material for flexible horseshoes, as described in U.S. Pat. Nos. 3,494,422; 3,490,536; and 3,469,631. The types of shoes as described in these references overcome some, but not all of the recognized shortcomings of metal horseshoes.

An existing need remains for an economical, light weight horseshoe which will protect the horse's hooves and be simple to attach to and remove from the horse's hooves.

SUMMARY OF THE PRESENT INVENTION

In accordance with the present invention, a lightweight, abrasion resistant, shock absorbant horseshoe is provided that essentially eliminates the known shortcomings of conventional horseshoes. The shoes are fabricated in conventional shapes from an ultra-high molecular weight ethylene polymer (UHMW PE). They can be fabricated from neat resin or resin formulations containing additives to provide various colors, metallic appearances, or special effects which include fluorescent or phosphorescent additives. Standard techniques commonly used by farriers can be used to attach the shoe to the hoof. Surprisingly, horseshoes made from UHMW PE can be cold formed to precisely fit the individual hoof using routine hammer-anvil techniques. Regular horseshoe nails can be used to attach the shoe, which has unusually high resistance to nail pullthrough.

The UHMW PE shoes weight only one eighth the weight of steel shoes of like volume and have twenty times the abrasion resistance of steel. The excellent shock absorbant, impact resistant, and sound dampening properties of these shoes indicate that concussion and shock to the horse's feet and legs on hard surfaces can be reduced seventy-five to eighty percent as compared with steel shoes. The somewhat rigid but flexible properties of the UHMW PE shoes allow for the natural action (expansion and contraction) of the hoof thereby reducing fatigue, corns, and potential damage to the tendons and ligaments. The abrasion resistant, self-lubricating properties of the UHMW PE shoe, coupled with the tensile strength and stiffness properties minimize wear and damage on hard surfaces while still providing good grip and allowing controlled action for normal leg action and breakover.

Actual wear data obtained from shoes of the present invention worn by horses indicate a useful life of the shoe equal to or possibly greater than that obtained with steel or other types of shoes such as hard rubber or urethane rubber shoes.

Various design features and surface contours can be readily incorporated into the shoes, including accurately positioned nail holes, toe bars or studs for traction, corrective hoof shape and thickness, and many other features so as to provide the optimum service and therapeutic requirements for the animal.

DESCRIPTION OF THE PREFERRED EMBODIMENTS

The ultra-high molecular weight (UHMW) ethylene polymers employed in the manufacture of the horseshoes of the invention constitute a well-known class of thermoplastic ethylene polymers. Such polymers can be homopolymers of ethylene or copolymers thereof having minor amounts, e.g., up to about 10 vol %, of a second hydrocarbon monomer such as butene-1 or the like copolymerized therewith. The ethylene polymers will have a molecular weight of at least about 1 million ($1.0 \times 10^6$). The properties of the horseshoes improve somewhat with the ethylene polymer's molecular weight. For ease of fabrication combined with properties of the finished shoes, it is preferred to employ ethylene polymers having molecular weights in the range of about 1-6 million and preferably about 3-6 million. As used herein, molecular weight values are determined by solution viscosity methods known and reported in the art. For convenience of description, the term "UHMW PE" is used in this application to refer to any ethylene polymer having the structure and composition referred to above.

Two UHMW PE's which have been employed successfully in the practice of the invention are Hifax 1900 ® produced by Hercules, Inc., Wilmington, Del., described as "an ultrahigh molecular weight, high-density polyethylene resin having a molecular weight range between 3 and 6 million"; and Hostalen GUR ® UHMW Polymer, produced by American Hoechst Plastics, Somerville, N.J., and described as "a high density polyethylene of very high molecular weight, prepared by the Ziegler low pressure polymerization process," with the molecular weight as measured by the solution viscosity method reported as being in the region of 3.5 to $6 \times 10^6$.

The properties of the UHMW PE resins which render them uniquely suitable in the fabrication of the horseshoes of the present invention are excellent abrasion resistance, impact resistance, high tensile strength, self-lubricating properties, and the desired stiffness. The combination of these properties provides a horseshoe with ideally suited toughness and overall properties, including the ability to forge or cold-form to the precise fit desired. The high Vicat softening point of 135°-138° C. along with the excellent low temperature impact resistance provide a useful temperature range for the products from −65° F. to 200° F. Typical properties of UHMW PE resin are shown in Table I.

TABLE I

| Typical Properties of UHMW PE | | |
| --- | --- | --- |
| Density, g/cm³ | ASTM D792 | 0.93-0.94 |
| VICAT Softening Point, °C. | D1525B | 135-138 |
| Hardness | | |
| Rockwell R Scale | D785 | 64 |
| Shore "D" | D2240 | 65-67 |
| Tensile Properties (1) | | |
| Max. Strength, psi | | 6,300 |
| Yield strength, psi | | 3,100-3,400 |
| Elongation at break, % | | greater than 350 |
| Flexural Modulus, psi, 1% secant | D790B | 150,000-170,000 |
| Izod impact, ft-lbs/in, notched | D256A | |
| 23° C. | | No Break |
| −40° C. | | No Break |

(1) Determined by ASTM 638 employing a cross head speed of two inches per minute.

The horseshoes are easily fabricated by compression molding of fine powdered UHMW PE. This molding technique provides shoes remarkably free of strains and with a remarkably good ability to hold shoe nails as described infra. Other molding techniques possibly can be employed, but may require special mold designs and molding conditions.

The following examples are set forth to illustrate the principles and practice of the invention to those skilled in the art.

EXAMPLE 1

An aluminum mold is prepared by milling a cavity of the approximate width and shape of a standard Diamond DS-00 steel shoe and to a depth of about 15/16ths inch. A male part then is cut from aluminum sheet stock of the same size and shape, but with sufficient clearance on the cavity walls so as to provide compression on the resin particles. Approximately 40 grams of 1900 UHMW Polymer (Hercules) is placed in the cavity and the male part is placed on top of the resin. The filled mold then is placed in a platen press that has been heated to an indicated 400° F. The resin is compressed to about ⅝ths inch and this thickness maintained, under pressure, for twenty minutes. The mold then is removed from the heated platen press and placed in a second press to cool, while maintaining 500 psi pressure. When cooled to room temperature, the mold is opened and the horseshoe removed.

EXAMPLE 2

To illustrate special aesthetic effects easily obtainable by the present invention, two UHMW PE resin powders (Hercules 1900 and Hostalen GUR 413) were dry blended with pigments to prepare the formulations shown in Table II. Horseshoes were molded therefrom as described in Example 1.

TABLE II

| Resin | Additive Type | Wt. % | Effect |
| --- | --- | --- | --- |
| Hercules 1900 | Carbon Black (Phillips) | 1.00 | Black horseshoes |
| Hostalen GUR 415 | Acetylene Black (Gulf) | 0.75 | Black horseshoes |
| Hostalen GUR 413 | Evergold Richpale #1575 (1) | 2.00 | Metallic appearance |
| Hostalen GUR 413 | Eterna Copper #120 (1) | 2.00 | Metallic appearance |
| Hostalen GUR 413 | Aluminum Brilliant #40NL (1) | 2.00 | Metallic appearance |
| Hostalen GUR 413 | Fluorescent Yellow #2266 (2) | 4.40 | Fluorescence |
| Hostalen GUR 413 | Phosphorescent Excite #2479 (2) | 4.00 | Phosphorescence |
| Hercules 1900 | Phosphorescent Red #2304 (2) | 2.00 | Phosphorescence |
| Hercules 1900 | Phosphorescent Red #2304 (2) | 4.00 | Phosphorescence |
| Hostalen GUR 413 | Phosphorescent Red #2304 (2) | 4.00 | Phosphorescence |
| Hercules 1900 | Fluoral Green Gold #084 (3) | 4.00 | Green-gold color |
| Hercules | Fluoral Yellow | 4.00 | Yellow color |

TABLE II-continued

| Resin | Additive Type | Wt. % | Effect |
|---|---|---|---|
| 1900 | #088 (3) | | |

(1) Atlantic Powdered Metals, Inc., NY, NY
(2) USR Optinox, Hackettstown, NJ
(3) BASF Wyandotte Corp., Parsippany, NJ As will be appreciated by those skilled in the art, any number of colorants, optical brighteners, and fluorescent or phosphorescent additives can be used to provide a wide variety of colors and special effects in the horseshoes. This offers particular advantage to show horses or those in competition, where it is common practice to match the color of the horseshoe with the hoof, which is usually accomplished with paint or enamel. Painted surfaces, especially metal, are subject to chipping or peeling, whereas the colored horseshoe of the subject invention is uniformly colored throughout, thereby offering a unique advantage.

Further, it will also be obvious to those skilled in the art that a wide variety of other additives can be incorporated into the basic UHMW PE polymer, as long as they do not substantially detract from the desirable properties of the shoes as described. Such additives include thermal stabilizers, UV stabilizers, antioxidants, lubricants, flow modifiers, and various processing aids, which can be used in amounts up to 20 weight % and include waxes, polymers, copolymers, terpolymers, and the like, and even RF absorbants used to preheat the resin.

Since it is known in the art that fillers, extenders, reinforcing agents, coupling agents, and the like can affect such properties as tensile strength, stiffness, elongation, impact, and abrasion resistance, it is included within the scope of the present invention to allow formulations of the UHMW PE to include these materials as long as the desirable properties of the shoes are retained.

In that the normal and customary practice for attaching horseshoes to the animal's hoof is to use nails, several horseshoes of the subject invention prepared by the compression molding technique described in the previous examples were subjected to a nail pull test. The procedure involved cutting the horseshoe into six segments of approximately equal length and numerically identifying each segment with respect to its relative position in the horseshoe. A pilot hole of 1/16th inch in diameter was drilled through the center of each test specimen, verticle to the plane of the shoe. A No. 4 horseshoe nail was forced into the pilot hole and the specimen mounted on an Instron tensile tester, such that the instrument measured and recorded the amount of force required to pull the nail completely through the specimen. The Instron crosshead speed was two inches per minute. The results are shown in Table III and indicate not only excellent nail pull strength, but a very uniform composition of the horseshoe.

TABLE III

| Composition | Specimen[1] | Thickness in inches | Max. Force in lbs. |
|---|---|---|---|
| Hercules 1900 | 1 | 0.3675 | 245 |
| | 2 | 0.3795 | 262 |
| | 3 | specimen damaged before test | |
| | 4 | 0.370 | 261 |
| | 5 | 0.370 | 265 |
| | 6 | 0.3795 | 257 |
| Average[2] | | 0.3733 ± 0.007 | 258 ± 9 |
| Hostalen | 1 | 0.392 | 245 |
| GUR 415 | 2 | 0.392 | 261 |
| | 3 | 0.395 | 257 |
| | 4 | 0.394 | 263 |
| | 5 | 0.393 | 266 |
| | 6 | 0.392 | 267 |
| Average[2] | | 0.393 ± 0.001 | 259 ± 8 |
| Hercules 1900 containing 0.75% carbon black | 1 | 0.362 | 241 |
| | 2 | 0.362 | 247 |
| | 3 | 0.364 | 248 |
| | 4 | 0.363 | 240 |
| | 5 | 0.364 | 242 |
| | 6 | 0.361 | 240 |
| Average[2] | | 0.3627 ± 0.001 | 243 ± 4 |
| GUR 413 containing 0.75% carbon black | 1 | specimen damaged before test | |
| | 2 | 0.300 | 239 |
| | 3 | 0.290 | 238 |
| | 4 | 0.300 | 240 |
| | 5 | 0.300 | 242 |
| | 6 | 0.300 | 241 |
| Average[2] | | 0.298 ± 0.005 | 240 ± 2 |

[1]Specimens numbered clockwise from the heel of horseshoe.
[2]Standard deviation shown at 95% level of confidence.

For some special purposes, e.g., for use on icy roads, it may be mandatory to provide a metal shoe with special road gripping surfaces. In this event, many of the advantages of the present invention can be obtained by providing a laminated shoe including a foot contacting liner lamina fabricated from an UHMW PE and a metal lamina for contact with the walking surface. Such laminated shoes are easily fabricated by simply gluing the two laminae together. The laminated shoes can be attached to the hoof by nailing.

A further advantage of the shoes of the invention is that an owner's identifying brand or indicia of ownership can be incorporated into or on the shoe. A unique chemical not identifiable by visual inspection can be incorporated into the UHMW PE. Such chemical, however, can be identified by a simple chemical test to identify a horse believed to have been stolen. As such a chemical can be employed in a small concentration, the manufacturer can keep a log of specific chemicals employed in each resin batch to readily identify the date of shoe manufacture and the date the shoes were shipped to particular customers. Such data can be useful to law enforcement agencies. Alternatively, a brand mark can be easily written on the shoe (preferably on the underside) with indelible ink felt tip markers or the like.

While the articles herein described constitute preferred embodiments of the invention, it is to be understood that the invention is not limited to these precise articles, and that changes may be made therein without departing from the scope of the invention which is defined in the appended claims.

What is claimed is:

1. A working horseshoe fabricated from an ultra-high molecular weight ethylene polymer having a molecular weight of at least about 1 million.

2. A working horseshoe of claim 1 in which the ultra-high molecular weight ethylene polymer has a molecular weight of about 1-6 million.

3. A working horseshoe of claim 2 bearing an indicia of ownership.

4. A method for preparing a working horseshoe of claim 1 which consists essentially of filling a female horseshoe mold with a fine powder of an ultra-high molecular weight ethylene polymer having a molecular weight of at least 1 million, inserting a complementary male mold into said female mold, applying pressure on said male mold to compress the resin in said female mold, heating said mold to fuse said resin particles, and thereafter cooling said mold while maintaining pressure thereon.

5. A working horseshoe of claim 1 bearing an indicia of ownership.

6. A laminated working horseshoe comprising a first lamina fabricated from an ultra-high molecular weight ethylene polymer having a molecular weight of at least 1 million for direct attachment to a horse's foot, and a second lamina fabricated from metal for contact with a walking surface.

7. A working horseshoe of claim 6 in which the ultra-high molecular weight ethylene polymer has a molecular weight of about 1-6 million.

8. A pad for protecting the foot of a horse and adapted to be applied directly to the horse's hoof and intermediate of the hoof and any working horseshoe carried on said hoof, said pad being fabricated from an ultra-high molecular weight ethylene polymer having a molecular weight of at least about 1 million.

9. A process for protecting the foot of a horse which comprises applying directly to the horse's foot a pad said pad being fabricated from an ultra-high molecular weight ethylene polymer having a molecular weight of at least about 1 million, and then applying a working horseshoe to said hoof.

* * * * *